(12) United States Patent
Berard et al.

(10) Patent No.: US 11,569,625 B2
(45) Date of Patent: Jan. 31, 2023

(54) SYSTEM FOR TRANSFERRING POWER BETWEEN A ROTATING ELEMENT AND A FIXED ELEMENT

(71) Applicant: MERSEN FRANCE AMIENS SAS, Amiens (FR)

(72) Inventors: Geoffroy Berard, Vaulx en Velin (FR); Radjy Ramlall, Wasquehal (FR); Olivier Bernard, Ledgewood, NJ (US)

(73) Assignee: MERSEN FRANCE AMIENS SAS, Amiens (FR)

( * ) Notice: Subject to any disclaimer, the term of this patent is extended or adjusted under 35 U.S.C. 154(b) by 53 days.

(21) Appl. No.: 17/257,365

(22) PCT Filed: Jul. 8, 2019

(86) PCT No.: PCT/FR2019/051686
§ 371 (c)(1),
(2) Date: Dec. 31, 2020

(87) PCT Pub. No.: WO2020/012099
PCT Pub. Date: Jan. 16, 2020

(65) Prior Publication Data
US 2021/0135417 A1    May 6, 2021

(30) Foreign Application Priority Data

Jul. 10, 2018 (FR) ..................... 1856336

(51) Int. Cl.
*H01R 39/58* (2006.01)
*H01R 39/38* (2006.01)
(Continued)

(52) U.S. Cl.
CPC ......... *H01R 39/385* (2013.01); *H02K 11/20* (2016.01); *H01R 39/58* (2013.01); *H02K 5/141* (2013.01)

(58) Field of Classification Search
CPC ...... H02K 5/148; H02K 13/003; H02K 5/141; H01R 39/58; H01R 39/385
See application file for complete search history.

(56) References Cited

U.S. PATENT DOCUMENTS 1,954,910 A * 4/1934 Allen ..................... H02K 5/148
310/239
4,475,053 A   10/1984 Mayer
(Continued)

FOREIGN PATENT DOCUMENTS

EP   0 098 991 A1   1/1984
FR   2 797 110 A1   2/2001
(Continued)

OTHER PUBLICATIONS

International Search Report for PCT/FR2019/051686 dated Dec. 5, 2019 [PCT/ISA/210].

*Primary Examiner* — Dang D Le
(74) *Attorney, Agent, or Firm* — Sughrue Mion, PLLC

(57) ABSTRACT

A system for transferring current between a rotating element and a fixed element, comprising—a support in the general shape of a sheet (10) comprising a conductive portion (11) electrically connected to the fixed element, —a brush holder (20) mounted on the support (10) and supporting a brush (30) that is pushed into contact against the rotating element, —electrical connection means (42) for connecting the conductive portion (11) of the support to a cable (40) that is joined to the brush (30), wherein a resistive element (12) is situated between the brush (30) and the conductive portion (11) of the support (10) and prevents current from flowing directly between the conductive portion and the brush.

15 Claims, 4 Drawing Sheets

(51) Int. Cl.
   *H02K 11/20*   (2016.01)
   *H02K 5/14*    (2006.01)

(56) References Cited

U.S. PATENT DOCUMENTS

| | | | | |
|---|---|---|---|---|
| 4,754,184 A * | 6/1988 | Morikane | ............. | H01R 39/40 |
| | | | | 310/239 |
| 4,845,396 A * | 7/1989 | Huber | .................... | H02K 5/148 |
| | | | | 310/239 |
| 9,071,119 B2 * | 6/2015 | Fuchs | .................... | H02K 9/227 |
| 10,177,623 B2 * | 1/2019 | Hirabayashi | ........... | H02K 5/148 |

FOREIGN PATENT DOCUMENTS

| | | |
|---|---|---|
| FR | 2 934 434 A1 | 1/2010 |
| WO | 2008/148583 A1 | 12/2008 |

\* cited by examiner

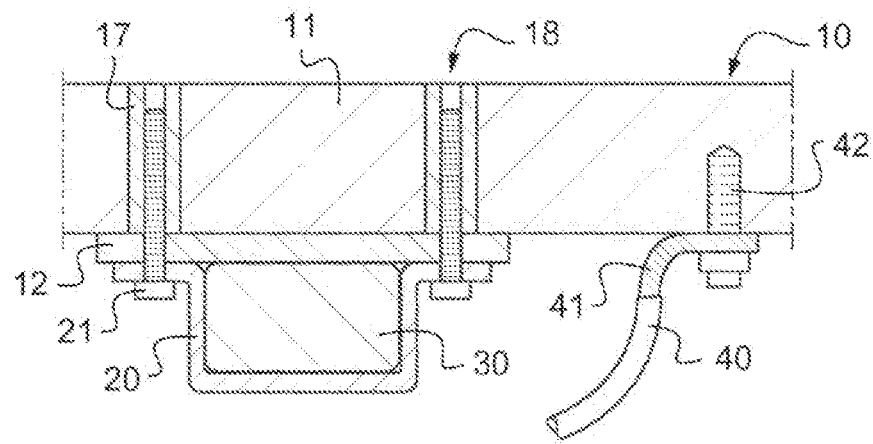
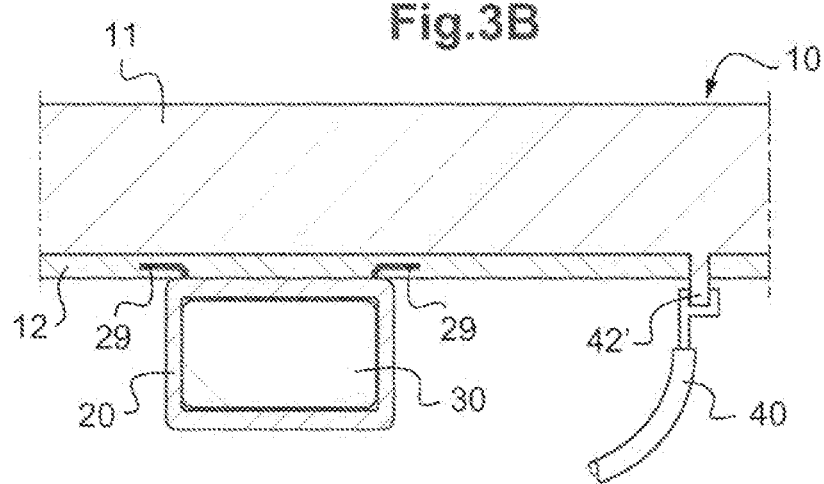
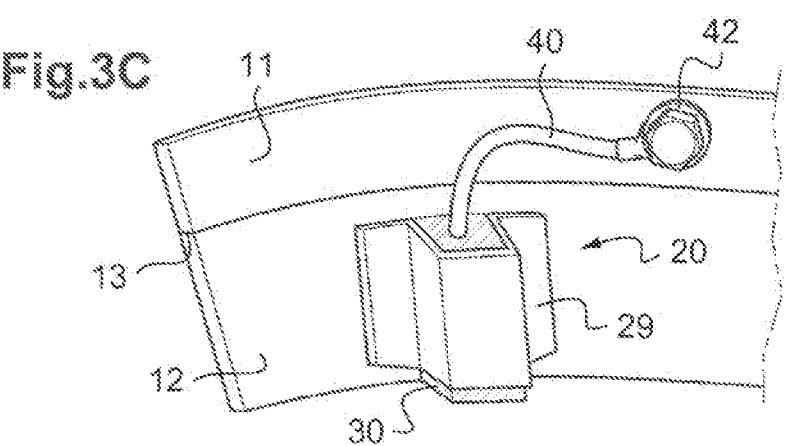

SYSTEM FOR TRANSFERRING POWER BETWEEN A ROTATING ELEMENT AND A FIXED ELEMENT

CROSS REFERENCE TO RELATED APPLICATIONS

This application is a National Stage of International Application No. PCT/FR2019/051686 filed Jul. 8, 2019, claiming priority based on French Patent Application No. 1856336 filed Jul. 10, 2018, the entire disclosures of which are incorporated by reference herein.

The invention relates to the transfer of electric current between a rotating element and a fixed element, the rotating element being moved with a movement of rotation with respect to the fixed element.

The invention can have a use for example in rotating electrical machines, in particular asynchronous, and more particularly in generators of wind turbines, or in industry (cement plants, ports, mines . . . ).

The invention can have a use for example in the case of transferred powers greater than 25 kW, for example between 25 kW and 100 kW (the latter value being excluded), or equal to 100 kW, or strictly greater than 100 kW, advantageously greater than 500 kW (in particular in the wind power industry).

The invention is in no way limited to a use in the wind power industry: for example, the invention can have a use in synchronous electric machines for power transfer, and in various fields, for example in the process industry (chemical industry, papermaking, etc.), aeronautics, aerospace, robotics, electricity production, or other.

The rotating element can be a rotor, a rotating shaft, a ring mounted on a rotating shaft, a slip ring, or other.

The fixed element can be a stator, a fixed coil, a fixed piece of equipment electrically connected to the flexibles of carbon brushes, or other.

Conventionally, carbon brushes ("carbon brush" in English, this expression also covering the case of brushes not comprising any carbon) or fiber brushes (also "fiber brush" in English), mounted on a fixed rocker (said also "rocker" in English) via a brush-holder and pressed against the rotating element, allow to ensure the transfer of the current between this rotating element and flexibles connected to the carbon brushes or to the fiber brushes, these flexibles being electrically connected to the fixed element.

It is known to use the rocker not only as a mechanical support but also for the transfer of the current to or from the element against which the carbon brush is pushed. The facility thus gains in terms of simplicity.

However, the manner in which the transfer of current effectively occurs between the element against which the carbon brush is pushed and the rocker is relatively difficult to monitor. In particular, the ruptures of the flexibles connected to the carbon brushes are difficult to detect, which can be problematic in the case of a not very accessible environment such as a wind turbine.

There is therefore a need for a system allowing better monitoring, which would allow to facilitate in particular the detections of failures.

It is proposed a current transfer system between a rotating element and a fixed element, the rotating element being moved with a movement of rotation with respect to the fixed element, said transfer system comprising a support having an overall shape of a plate on the periphery of the axis of rotation of the rotating element, comprising a conductive portion electrically connected to one out of the fixed element and the rotating element, at least one, and advantageously several, brush-holder mounted on and supported by, or integrated onto, the support, and shaped to hold at least one conductive sliding contact element, intended to be pushed into contact against the other out of the fixed element and the rotating element, a resistance element located between this conductive sliding contact element and the conductive portion of the support when the conductive sliding contact element held by the brush-holder is pushed into contact, to limit the passage of current directly between the conductive portion, for example the conductive plate, and the conductive sliding contact element, means for electric connection of the conductive portion of the support to a flexible rigidly connected to the conductive sliding contact element for the transfer of current between this conductive portion and the conductive sliding contact element.

The resistance element can have an electric resistance greater than or equal to the electric resistance of the conductive sliding contact element.

The system can comprise said conductive sliding contact element, supported by a brush-holder and intended to be pushed into contact, but it is understood that it can be marketed without a carbon brush.

The electric resistance of the conductive sliding contact element can be measured between an end intended to be in contact with the other out of the fixed element and the rotating element (for example a contact surface) and the end opposite to this end (for example a terminal). A definition of the electric resistance of a carbon brush can be found in the standard CEI 60136.

For example, the resistance element can have an electric resistance of at least 0.3 ohms, advantageously of at least 0.5 ohms, advantageously of at least 1 ohm, advantageously of at least 100 ohms, advantageously of at least 1 kiloohm.

This arrangement can allow that, when the conductive sliding contact element is installed in such a way as to be pushed against this other element (the rotating element for example), the totality or the quasi-totality (for example more than 95% of the intensity) of the current circulating between this contact element and this other element passes through the means for electric connection, for example one or more flexibles rigidly connected to this contact element. In other words, the resistance element imposes a path for the transfer of current.

The monitoring of the transfer of current between the rotating element and the fixed element can thus be simpler to carry out, even in the case of an alternating or non-constant current, insofar as the presumed path of the current is already determined.

For example, when several conductive sliding contact elements are provided, such a system can allow to facilitate the detection of an imbalance, in terms of current intensity, from one conductive sliding contact element to another.

Moreover, in the case of a rupture of a flexible, no more current passes through the conductive sliding contact element affected, for example a carbon brush, thus avoiding operation in degraded mode in which the current would pass from the conductive portion to the carbon brush by the walls of the carbon brush, for example via the brush-holder.

Surprisingly, even with a relatively low electric resistance, approximately one ohm, the totality or the quasi-totality (for example more than 95% of the intensity) of the current circulating between this conductive sliding contact element and this other element passes through the flexible(s) rigidly connected to this conductive sliding contact elements, even after a significant time of use, for example approximately several months.

For example, the resistance element can comprise an insulating element located between this conductive sliding contact element and the conductive portion of the support when the conductive sliding contact element is supported by the brush-holder and pushed into contact. The system can be shaped so that the insulating element thus prevents the passage of current directly between the conductive portion and the conductive sliding contact elements.

The insulating element has an electric resistance of at least 100 kiloohms.

In one embodiment, the resistance element can be distinct from the support and from the brush-holder. This distinct element can for example be fastened onto the support and/or onto the brush-holder.

The resistance element can for example be part of, or comprise, the brush-holder.

Advantageously, this insulating element, and more generally the resistance element, can be part of the support having the overall shape of a plate. Thus, the support can further comprise a resistant portion, advantageously an insulating portion. The resistance element (advantageously insulating) thus comprises this resistant (advantageously insulating) portion.

In one embodiment, resistant (advantageously insulating) material can for example be applied onto the brush-holder and/or onto the conductive portion of the support.

The resistant or insulating material can further allow to protect the brush-holder and/or the support.

The resistant (advantageously insulating) material can be an insulating coating, for example an anti-flash paint, a plastic, or other. This material can have a resistivity of at least 0.1 ohm-meters, advantageously of at least 1 ohm-meter, advantageously of at least $10^3$ ohm-meters.

Advantageously, the resistant (advantageously insulating) material can be chosen so that its resistivity varies by less than 1% when subjected to voltages between 600V and 1000V and advantageously even for voltages between 230V and 2700V.

The brush-holder can for example be made from a resistant, advantageously insulating, material, for example a polymer, or be at least partly coated with a resistant, advantageously insulating, material. In the latter case, a brush-holder made by drawing of a metal sheet covered with insulating material can be provided.

In the case of a resistance element that is part of the support, it is possible for one out of the conductive portion and the resistant (advantageously insulating) portion to be able to be obtained by applying a conductive or respectively resistant (advantageously insulating) material against or onto the other out of the resistance element and the conductive portion.

The resistance portion can thus allow to protect the conductive portion, at least for the surfaces and/or edges of the conductive portion covered by the resistant material, which can be of interest in the case of an aggressive environment.

The support having an overall shape of a plate can advantageously be non-convex, for example define several segments rectilinear and forming angles between them, in order to at least partly surround the rotating element, or other.

Advantageously, the support having the overall shape of a plate can be circle arc shaped.

The support can extend over plus 20°, 60°, 90°, 180°, or even 360°—in which case it is a closed rocker.

This support can advantageously be disposed concentrically with the rotating element, that is to say that the support defines radial directions converging towards a point on or close to the axis of rotation of the rotating element.

Alternatively, the support having the overall shape of a plate can have rectilinear contours from one end to the other of the support. For example, this support can have a rectangular or square shape.

The support can have in particular a thickness greater than 0.5 millimeters, for example of approximately 1 to 20 millimeters.

The conductive portion of the support having the overall shape of a plate can for example comprise a conductive plate.

In one embodiment, this conductive plate can occupy more than 90% of, advantageously more than 95% of, advantageously the entirety of the surface of the support having the overall shape of a plate.

In the present application, it is understood that a plate comprises two surfaces opposite to one another, distant from one another by the thickness of the plate, and edges. The thickness of the plate is much less than at least one of the dimensions of the surfaces, for example at least 10 times less than the length of the surface. Under normal conditions of use, the surfaces are in planes normal to the direction of the axis of rotation, or substantially normal to this direction.

This conductive plate can be relatively robust and have in particular a thickness greater than 0.5 millimeters, for example approximately 1 to 20 millimeters, for example between 3 and 6 millimeters, in particular in the case of a conductive portion made of copper. This can also be called a busbar (or"busbar" in English).

The conductive plate can be for example in the shape of a circle arc and can extend over 20°, 60°, 90°, 180° or even 360°—in which case it is a closed rocker.

Alternatively, the conductive plate can have a rectangular, square shape, which can allow to integrate other elements to be fastened in the machine, or even be integrated from the moment of design into the fixed part of the machine for example.

The support can for example be integrated from the moment of design into the fixed part of the machine, or not.

In another embodiment, the conductive plate can occupy less than 90% of the surface of the support having the overall shape of a plate, in particular less than 70%, 60% or 50% of this surface.

In the case of a resistance element comprising a resistant portion that is part of the support, the conductive plate can advantageously adjoin at least a part of the resistant (advantageously insulating) portion, this part having the shape of a plate, so that the conductive plate and at least this part of the resistant (advantageously insulating) portion are in contact via their thickness.

Resistant (advantageously insulating) material can thus have been applied against the conductive plate to form this part having the shape of a plate adjoining the conductive plate.

At least this part of the resistant (advantageously insulating) portion can occupy more than 10% of the surface of the support, advantageously more than 30%, 40% or 50% of this surface.

The brush-holder can for example be installed on at least this part of the resistant (advantageously insulating) portion, without direct electric contact with the conductive portion. This insulating part thus located between the conductive sliding contact element and the conductive portion limits or prevents the passage of current directly between the conductive portion and the conductive sliding contact element.

For example, the conductive plate can be on the periphery of at least this part of the resistant (advantageously insulating) portion, the outer edge in the shape of a circle arc of at least this part of the resistant (advantageously insulating) portion touching the (complementary) inner edge in the shape of a circle arc of the conductive plate.

Advantageously, at least a part of the resistant (advantageously insulating) portion can comprise a layer of resistant (advantageously insulating) material, called resistant (advantageously insulating) layer, applied onto at least a part of at least one surface of the conductive plate.

This resistant (advantageously insulating) layer can for example extend at least in a plane sandwiched between the conductive plate and the conductive sliding contact element when supported by the brush-holder and pushed into contact, this resistant (advantageously insulating) layer thus preventing the passage of current directly between the conductive plate and the conductive sliding contact element.

The layer of resistant (advantageously insulating) material can be directly in contact with a surface of the conductive plate, or not. A spacer layer between the layer of resistant (advantageously insulating) material and the surface of the conductive plate can for example be provided.

The layer of resistant (advantageously insulating) material can be directly in contact with a wall of the element for sliding contact, or not. In particular, the layer of resistant (advantageously insulating) material can be in contact with a brush-holder, in particular when this brush-holder defines a cage entirely surrounding a carbon brush.

The layer of resistant and/or insulating material can advantageously cover more than 10%, advantageously more than 80%, and in particular the totality of at least one surface of the conductive plate.

The layer of resistant (advantageously insulating) material can be applied onto at least a part of only one of the two surfaces of the conductive plate, or onto both surfaces.

The layer of resistant (advantageously insulating) material can cover the entirety of both surfaces of the conductive plate.

The layer of resistant (advantageously insulating) material can be relatively fine, in particular in the case of a resistant (advantageously insulating) material applied in the liquid state, for example via a brush or a spray, or not. The layer of resistant (advantageously insulating) material can have in particular a thickness greater than 10 micrometers, for example between 0.01 and 20 millimeters.

In one embodiment, the resistant (advantageously insulating) layer can for example be overmolded or coated onto the conductive portion.

The conductive portion can for example be made of copper, or other conductive material(s). The conductive portion can comprise several layers made from different conductive materials, for example a layer of copper and a layer of steel to reconcile conductivity and robustness.

The resistance element can for example be made from graphite or other.

The insulating element can for example be made from one or more insulating materials, for example from polymer, in particular when the conductive portion comprises tracks made of copper.

The conductive plate and/or the support can advantageously be flat in a plane including the tangential and radial direction—normal (or substantially normal) to the axis of rotation.

The conductive plate and/or the support (advantageously insulating) can for example be cut out, for example circle arc shaped, molded, or other.

The support having the overall shape of a plate can for example be rigidly connected to the fixed element.

The conductive sliding contact element can for example comprise a carbon brush, in which case the brush-holder mounted on and supported by the support can be shaped to receive a carbon brush and push it into contact against the other out of the fixed element and the mobile element.

The carbon brush can conventionally comprise carbon, for example in the form of graphite, or not.

For example the carbon brush can be made from a material comprising substantially carbon and metal, for example obtained by mixing a carbon powder and a metal powder. This metal can for example comprise silver. It is possible to substitute a part or the entirety of the silver with copper or with another metal.

The brush-holder can for example comprise a spring element to push the carbon brush towards the other element.

The invention is in no way limited to contact carbon brushes. For example, the conductive sliding contact element can comprise a contact of fibers brush with fibers or wires, for example a comb-like bundle of carbon fibers or other. A rocker made of aluminum, in two parts, assembled onto a stator, brush-holders each fastened onto the rocker and onto which comb-like bundles made of carbon fibers are mounted, can for example be provided.

In the case of contact fibers brushes, the system can be devoid of spring elements used to push the contact element against the other element out of the fixed element and the rotating element. The brush-holders can indeed be disposed sufficiently close to the other element, and the fibers of the fibers brush can be sufficiently long and rigid for the fibers themselves to push at least a part of their end into contact against the other element.

But of course, spring elements can also be provided to push contact fibers brushes against this other element.

The resistance element allows to create an environment more favorable to the installation of sensors than the conductive portion capable of being subjected to strong and/or variable currents, allowing here again to better manage the monitoring of the transfer of current. In particular, the resistant (advantageously insulating) portion can allow to limit the contacts between the sensors and the conductive portion.

The resistance element has dimensions adapted to prevent any direct electric contact between the faces of the contact element and the conductive portion through which the current passes. For example, the resistance element (advantageously insulating) can cover the entirety or more than 80% of the face of a conductive plate onto which the contact element is mounted. According to another example, the resistance element has dimensions close to those of the contact element: an insulating material can for example be applied onto the conductive plate at the location of the contact element.

According to yet another example, the resistance element (advantageously insulating) can have dimensions smaller than those of the face of the contact element facing the face of the conductive plate, insofar as this element is sufficiently thick to prevent contacts as well as the formation of electric arcs between the contact element and the conductive plate.

Advantageously, resistant (advantageously insulating) material can be applied onto or against the conductive portion (respectively onto or against the brush-holder) in a non-removable manner.

More generally, it is possible for the resistance element (advantageously insulating) to not be able to be separated from the conductive portion (respectively, from the brush-holder) without degradation of the transfer system.

Advantageously, the transfer system can further comprise at least one sensor capable of measuring a parameter value characterizing the operation of the conductive sliding contact element, for example a sensor of temperature, current, wear, acceleration (for example by detecting abnormal vibrations), or other.

This or these sensor(s) can allow to detect the non-passage of current in the flexible or an imbalance from one contact element to the other, etc.

This or these sensor(s) can allow to detect flexible ruptures, so that after the emission of an alert message, a decision can be taken (for example stopping use, repair, etc.), thus allowing to avoid overloading a smaller number of carbon brushes.

This or these sensor(s) can be installed in or on the resistance element, advantageously in or on the insulating element. In the case of a resistance element obtained by application of a material in the fluid state, one or more sensors can be embedded in this material.

This or these sensors can for example be installed in a resistant portion of the support and/or in resistant material of the brush-holder.

In one embodiment, the system can further comprise at least two conductive linear elements (wires, tracks, ribbons . . . ) electrically connecting the sensor to processing means in order to exchange measurements or commands.

In the case of sensors mounted on a resistance element fastened to or integrated into the brush-holder, an electric connection can be provided between these sensors and a card mounted on the support, for example embedded in insulating material forming an insulating portion of the support.

Alternatively or in addition, means for wirelessly transmitting data, for example Bluetooth, ZigBee or other, can absolutely be provided.

Advantageously and in a non-limiting manner, these conductive linear elements can be at least partly embedded in insulating material.

Advantageously and in a non-limiting manner, these elements can be at least partly embedded in the resistant (advantageously insulating) portion. The existence of the resistant (advantageously insulating) portion is taken advantage of to protect the conductive linear elements.

In one embodiment, the system can further comprise processing means, for example a microcontroller, a microprocessor, or other.

Advantageously and in a non-limiting manner, these processing means can be at least partly embedded in resistant (advantageously insulating) material, advantageously in the insulating portion. The existence of the insulating portion is taken advantage of to protect the processing means.

Alternatively, the processing means can be mounted on the system and/or remote, for example accessible via a telecommunications network, for example a mobile telephony network or other.

Advantageously, these processing means can be arranged to control the transfer system. For example, the processing means can be in communication with an actuator, for example an actuator of the rotating element (for example a transmission), of a ventilation device (fan, extractor, or other) and/or other.

The invention is in no way limited to a control of the transfer system by processing means. The control can for example be carried out by a human operator—in which case it is for example possible to display data coming from measurements carried out by the sensors on a screen or a supervision system, for example SCADA (for "Supervisory Control and Data Acquisition") in the wind power industry.

Advantageously and in a non-limiting manner, the processing means arranged to control the transfer system can be in communication with the sensor(s).

Advantageously, these processing means can be arranged to control the transfer system according to the measured values coming from the sensor(s).

For example, the processing means can generate, on the basis of received measurement values, messages for control of the rotating element, for example by controlling the torque, or of the ventilation device, by controlling its flow rate and/or the temperature of the circulating air.

In an advantageous embodiment, the processing means can be arranged to emit a message for control of the ventilation device in the case of detection of an imbalance in the collected/injected currents from one conductive sliding contact element to another.

This control message can be created in such a way as to increase the cooling of at least one conductive sliding contact element, for example by increasing the flow rate and/or by decreasing the temperature of the circulating air.

Such a control can allow to favor the transfer of current. In particular, by controlling the ventilation, the temperature can be adjusted. By lowering the temperature and/or by adjusting the flow rate of the air in order to favor the dissipation of heat in the transfer system, in certain cases it is possible to aim to at least partly rebalance the currents from one contact element to another.

The ventilation can further allow to cool or to limit the heating of the rotating element.

Advantageously, the processing means can be arranged so that in the case of detection of non-transmission of current by a conductive sliding contact element (for example detection of a rupture of the corresponding flexible), the control message is created in such a way as to increase the cooling of at least the other conductive sliding contact element(s), for example the cooling of all the conductive elements for sliding contact. The overheating of the conductive sliding contact element(s) in operation and de facto overloaded can thus be limited.

Advantageously, the processing means can be arranged so that in the case of detection of an imbalance in the collected/injected currents from one conductive sliding contact element to another while all the conductive elements for sliding contact transmit current, the control message is created in such a way as to increase the cooling at least of the conductive sliding contact element(s) transmitting the most current, in order to limit the degradations related to the overloading of this or these conductive sliding contact element(s).

In one embodiment, and in particular when the resistant or insulating material is applied onto the plate and/or onto the brush-holder, this material can be deposited by deforming onto the conductive plate and/or onto the brush-holder a resistant (advantageously insulating) material, said material advantageously already having the shape of a layer before the deformation. This operation can be carried out cold or at a temperature below the temperature at which this insulating material changes composition or phase.

Advantageously, the resistance element (advantageously insulating) can be coated and/or overmolded around the conductive plate and/or the brush-holder, for example by coating or potting ("potting" in English), glued to the conductive plate, or its material can be applied, for example with a brush, by a spray or other, when in liquid, vapor or powder state onto the plate and/or the brush-holder, or other.

The material of the resistant (advantageously insulating) portion can be laminated onto the conductive plate, or be applied manually, or other.

In one embodiment, the resistant (advantageously insulating) element can comprise a paint or a varnish, for example a paint comprising a resin, for example an epoxy resin or other. This can be of interest in particular in the case of a brush-holder receiving several carbon brushes: a varnish can be applied onto the inner walls of the brush-holder to insulate the carbon brushes from each other.

In one embodiment, the insulating material can comprise thermoplastic polymer material, in particular a thermosetting polymer material.

For example, polyethylene naphthalate or PEN, for example a Teonex® film, can be used.

In this case, it is possible to heat this material to a temperature of for example 120° C., in order to deform the layer.

In one embodiment, the insulating material can comprise a polyimide, for example in the form of a film, for example Kapton®, for example a Kapton® film.

In one embodiment, the polyimide film can be embedded in PEN.

Advantageously, all or a part of the brush-holder can be fastened in a non-removable manner onto the support, that is to say that the brush-holder cannot be separated from the conductive plate without degradation of the transfer system. Thus, it is not necessary to provide adjustments to position the brush-holder during the installation of the busbar.

For example, at least a part of the brush-holder can be fastened by lamination in the resistant (advantageously insulating) portion.

In particular, the brush-holder can be obtained from a sheet of metal, for example by folding and/or drawing. Then the end edges of this sheet are then laminated with the resistant (advantageously insulating) portion, in such a way as to fasten the brush-holder onto the support.

In one embodiment, the brush-holder can comprise two elements that can be assembled to one another in a reversible manner, only one of these elements being fastened in a non-removable manner onto the support.

For example, the brush-holder can comprise:
a removable part comprising at least a part of the cage intended to receive the carbon brush,
an adapter part fastened in a non-removable manner onto the support, for example onto the resistant (advantageously insulating) portion.

Advantageously, the removable part can be adjustable in the radial direction, thus allowing to adapt the positioning of the cage with respect to the diameter of the rotating element. This can allow to facilitate the respect of the recommendation according to which the cage and the ring must be distant by 2-3 millimeters.

Advantageously, a plug-set (or "plug-set" in English) system can be provided for allowing to connect/disconnect the carbon brushes while the machine is under load, in particular in the case of a use in the synchronous generators of hydroelectric power plants.

Advantageously the non-removable part fastened onto the support can be partly embedded in the resistant (advantageously insulating) material.

An assembly is further proposed comprising a rotating element, a fixed element, and the system for transferring data described above. This assembly can be integrated into a wind turbine, or not.

This assembly can comprise several supports, or a single support.

A wind turbine comprising this assembly is also proposed. The rotating element can comprise the high-speed shaft, be rigidly connected to this shaft or be driven in movement by this shaft.

The invention has a use in the transfer of power via a rotating contact, in particular of high voltages, greater than 100V, advantageously greater than 400V, and/or of high electric powers, greater than 0.1 MW, advantageously greater than 500 kW (in particular in the wind power industry).

More generally, the invention can have a use for the transfer of powers greater than or equal to 25 kW, for example between 25 kW and 100 kW, the latter value being excluded (in particular in industry), equal to 100 kW (in particular in industry or in the wind power industry), or strictly greater than 100 kW (in particular in the wind power industry), for example greater than or equal to 200 kW.

It is thus proposed to use the assembly described above in industry, in particular cement plants, ports, mines, etc., or in the wind power industry.

The invention is not limited to the transfer of continuous signals: for example, the transfer system can be used for the connection of grounds. Four systems can for example be provided, each with a rocker of the busbar type: three of these rockers are used for the transfer of a corresponding phase, while the last rocker is dedicated to the transfer of a ground signal that is generally null, but subject to relatively unpredictable variations.

The connection means can comprise a pin or a rod, a device with a screw and bolt cooperating with an orifice defined in the conductive plate and with a terminal of a flexible end, a male or female connector intended to cooperate with a female or male connector, respectively of a flexible end, tabs in the plane of the conductive plate, made in a single piece with the conductive plate, or other.

It is further proposed a method for manufacturing a current transfer system between a rotating element and a fixed element, the rotating element being moved with a movement of rotation with respect to the fixed element, the method comprising
providing a support having an overall shape of a plate, intended to be located on the periphery of the axis of rotation of the rotating element, comprising a conductive portion, the conductive portion being intended to be electrically connected to one out of the fixed element and the rotating element,
providing at least one brush-holder installed on or integrated into the support, shaped to hold a conductive sliding contact element intended to be pushed into contact against the other out of the fixed element and the rotating element,
installing a conductive sliding contact element in the brush-holder,
providing a resistance element located between the conductive sliding contact element and the conductive portion of the support, this resistance element having an electric resistance greater than or equal to that of the conductive sliding contact element,
providing means for electric connection of the conductive portion to a flexible rigidly connected to the conductive sliding contact element for the transfer of current between the conductive plate and the conductive sliding contact element.

The invention is of course not limited by any order of the steps mentioned above.

At least one out of the support and the brush-holder can advantageously comprise the resistance element, advantageously insulating, thus disposed between the conductive sliding contact element and the conductive portion of the support.

Spring means, a brush support and/or other can optionally further be installed.

Advantageously and in a non-limiting manner, resistant, advantageously insulating, material can further be applied onto or against the conductive portion and/or the brush-holder, in such a way as to form a resistant (advantageously insulating) portion.

The step of applying resistant, advantageously insulating, material can advantageously be carried out by deforming this resistant or insulating material onto all or a part of at least one of the faces of the conductive plate and/or onto the brush-holder.

In one embodiment, the brush-holder can be obtained from a sheet of metal, for example by folding or drawing this sheet of metal.

The brush-holder can comprise walls defining a housing for a carbon brush, for example three or four walls.

In one embodiment, the brush-holder can comprise at least one fastening element extending from one of the walls of the brush-holder towards the outside of the brush-holder, in a plane offset with respect to the housing of the carbon brush, for example a fastening lug or tab coming from a sheet of metal, for example the same sheet of metal as that from which the brush-holder comes.

In one embodiment, the method can further comprise a step involving laminating this lug into the resistant or insulating material of the resistant or insulating portion.

In another embodiment, the fastening tab can be pierced by an orifice, and the method can comprise a step involving fastening this tab to the support by screwing or equivalent.

The brush-holder can be entirely or partly conductive, or entirely or partly insulating.

The invention will be better described in reference to the following drawings, which show non-limiting embodiments given as examples.

FIG. 1 schematically shows a wind turbine according to an embodiment of the invention.

FIG. 3A is a cross-sectional and schematic view of an example of a transfer system according to an embodiment of the invention, in which the insulating layer is relatively localized and the brush-holder is screwed onto the insulating layer, in a reversible manner.

FIG. 3B is a cross-sectional and schematic view of another example of a transfer system according to an embodiment of the invention.

FIG. 3C is a perspective and schematic view of yet another example of a transfer system according to an embodiment of the invention.

Identical references can designate elements that are identical or similar, in their form or their function, from one drawing to another.

Figure 1:
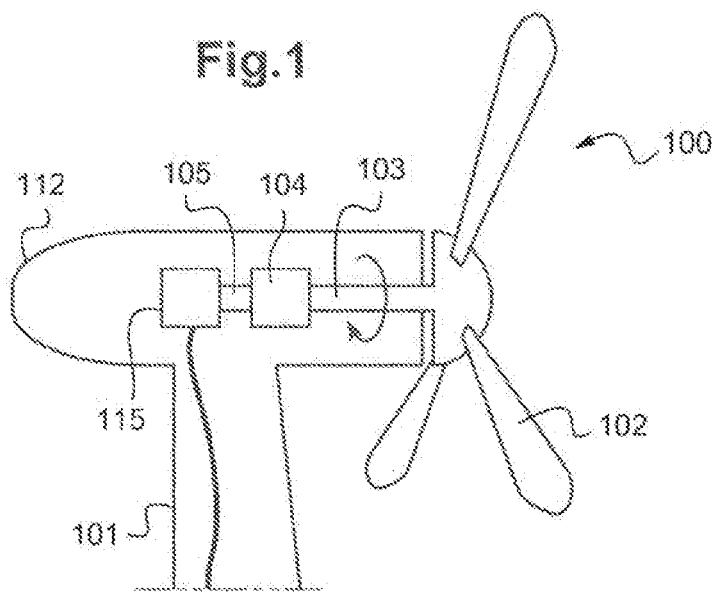

In reference to FIG. 1, a wind turbine 100 comprises a tower 101, a nacelle 112 and blades 102 rigidly connected to a "low-speed" shaft 103.

A multiplier 104 allows to convert the movement of rotation of the low-speed shaft 103 into a faster movement of a "high-speed" shaft 105.

A generator 115 allows to generate current from the movement of this high-speed shaft 105.

This generator 115 is a rotating electric machine comprising a rotor, a stator and carbon brushes. It will be described in more detail in reference to FIG. 3.

Figure 2:
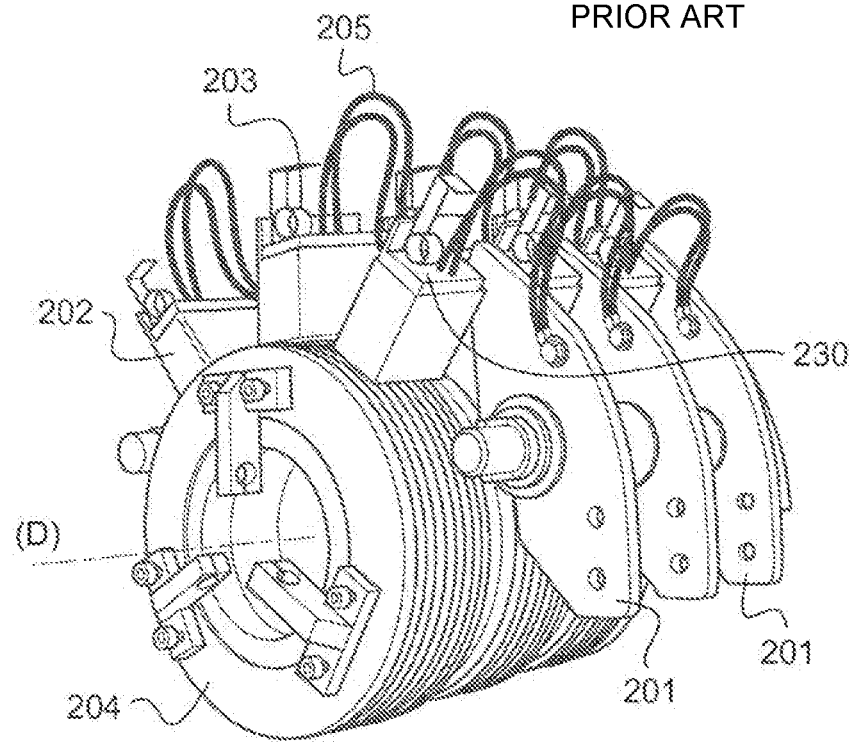
FIG. 2 shows an example of a transfer system of the type known from the prior art.

FIG. 2 illustrates an example of a generator of the type known from the prior art.

In reference to this drawing, conductive plates 201 in the shape of a circle arc are disposed around an axis of rotation (D). These conductive plates are rigidly connected to a stator not shown.

Brush-holders 202 are fastened onto the conductive plates 201. Each brush-holder defines a cage to receive a carbon brush 230 as well as a spring means 203 for pushing this carbon brush into contact against rings of the rotating element 204 of the generator. The shaft of the rotor is not shown in this FIG. 2.

Flexibles 205 fastened to the carbon brush by one end have their other end connected to connections 206 in electric contact with the plate element 201.

However, the brush-holders 202 are themselves conductive so that the current produced can circulate from a carbon brush towards the corresponding plate 201 via the corresponding brush-holder, without passing through the flexibles 205.

A rupture of a flexible 205 thus may not be detected. Also, an imbalance in the collection of current from one carbon brush to another may not be detected.

In reference to FIG. 3A, a support is provided having the overall shape of a plate 10, here seen in a cross-section. This support 10 comprises a conductive plate 11, of the busbar type, and over a part of which a layer of insulating material 12 has been applied.

A brush-holder 20 has been fastened onto the layer 12, here with screws 21.

This brush-holder 20 is made from a metal sheet. This sheet is folded or drawn in such a way as to define with the insulating layer 12 a housing to receive a carbon brush 30.

A spring not shown allows to push the carbon brush 30 in a direction normal to the plane of the sheet, towards for example a ring.

In a manner known per se, the carbon brush is connected to a flexible 40.

This flexible 40 is itself connected to a terminal 41 which is fastened by a threaded rod-nut system 42 into the conductive plate 11.

It can be noted that the screws 21 used to fasten the brush-holder 20 to the insulating layer 12 are received in an orifice 18 passing through the conductive portion 11. An insert 17 made of insulating material covers the walls of the orifice 18: the carbon brush 30 is only in contact with the conductive plate 11 via the flexible 40.

In the case of screws sufficiently long for a part to protrude from the side opposite to the brush-holder side, it is possible to cover the ends of the screws with an insulant of the washer, plug, or other type.

Alternatively or in addition, the screws themselves could be made from an insulating material or covered with insulating material. PTFE (polytetrafluoroethylene) or other can for example be used.

The insulating material of the insert 17 can for example be a composite of epoxy resin reinforced with glass fibers. The same material can be chosen for the insulating layer 12, or not.

The current collected by the carbon brush 30 thus arrives in the conductive plate 11 via the flexible 40.

In this example, the insulating layer can be made for example from a composite of epoxy resin reinforced with glass fibers.

In an alternative embodiment not shown, instead of the insulating layer 12, a resistant layer can be provided, for example obtained by applying a paint onto a part of the surface of the plate 11.

In this example, the insulating layer 12 extends over only a part of the surface of the conductive plate 11, this part corresponding to the location of the brush-holder 20.

In the example of FIG. 3B, insulating material 12 has been applied onto the entire surface of the conductive plate 11, with the exception of the contacts stud 42'.

The brush-holder 20 defines a cage with four sides, and comprises two lugs 29 in a plane offset with respect to the location of the carbon brush and embedded in the insulating material 12, these lugs not being in direct electric contact with the conductive plate 11.

The insulating layer 12 is thus located between the graphite carbon brush 30 and the conductive plate 11, and is shaped to prevent any passage of current between the carbon brush 30 and the conductive plate 11 other than via the flexible 40 connected to the contact stud 42'.

In this FIG. 3B, the spring means for pushing the carbon brush towards the rotating element have not been shown either.

In reference to FIG. 3C, the spring means are not shown either, but on the contrary, it can be seen how the flexible 40 is fastened to the carbon brush 30.

In this embodiment the support 10 comprises a conductive plate 11 in the shape of a circle arc, adjoining a part of the insulating portion 12. The insulating material has been applied against an edge 13 of the conductive plate 11, forming an insulating part 12.

In this example, the brush-holder has been obtained by drawing a sheet and by fastening lugs 29 onto the insulating portion 12 by any suitable means, for example by lamination, by gluing or other.

The carbon brush 30 is in contact with the insulating material 12, which prevents any transfer of current between the carbon brush 30 and the conductive plate 11 other than via a flexible not shown.

In an embodiment that is not shown, the support can comprise an insulating plate and a conductive portion consisting of a track made of metal mounted on this insulating plate or embedded in the material of this insulating plate.

Figure 4:
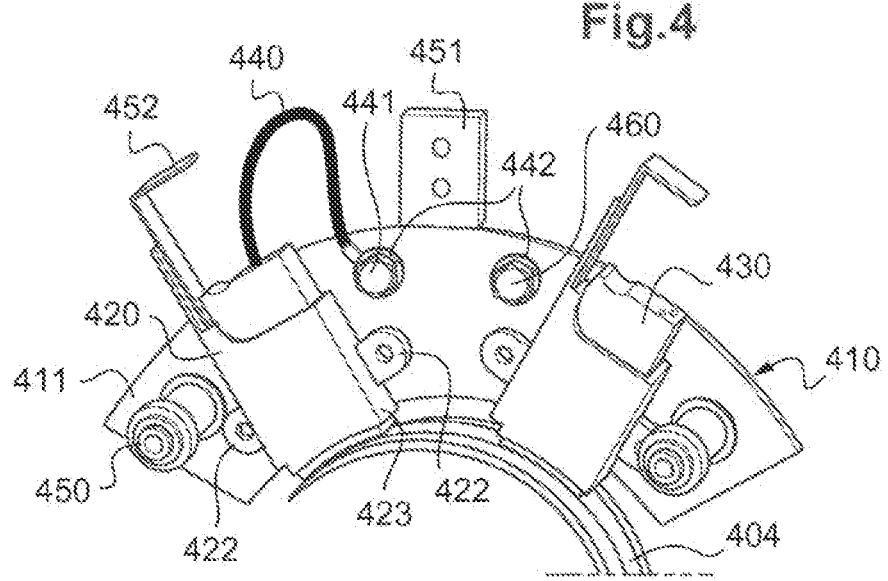
FIG. 4 is a perspective view of an example of a transfer system according to an embodiment of the invention, in which the insulating layer covers the entirety of the conductive plate and the brush-holder laminated in the insulating layer, the insulating layer not being shown in this drawing.

In the embodiment of FIG. 4, a support 410 having an overall shape of a plate comprising a metal plate 411 of the busbar type, at least one face of which (that visible in FIG. 4) is entirely covered with insulating material not shown in this FIG. 4, is provided.

This support 401 is concave on the side of the rotor 404, in such a way as to partly surround the rotor.

A mounting rod 450 allows to fasten the support 410 onto a fixed part not shown.

An electric connection bar 451 allows to electrically connect the support 411 to power-transfer flexibles (not shown) installed on a fixed part of the nacelle.

Two brush-holders 420 are fastened in a non-removable manner onto the support 410. These brush-holders 420 each define a cage for receiving a carbon brush 430 and further comprise a pressure system 450 for receiving a spring not shown, this spring allowing to push the corresponding carbon brush against the rotor 404.

Each brush-holder 420 comprises two lugs 422 each extending from a wall 423 of the brush-holder towards the outside of the brush-holder, in a plane offset with respect to the location of the carbon brush.

Each lug 422 has been laminated in the insulating layer not shown, thus allowing to fasten the brush-holders 420 in a non-removable manner onto the support 410. The lamination is carried out while taking care to avoid any contact between the lugs and the busbar 411, thus avoiding creating a path for the passage of the current collected from the rotor 404 other than that passing through the flexibles 440.

Alternatively, in an embodiment not shown, the orifices of the lugs 422 could for example be used to fasten these lugs by screwing against inserts covering the walls of corresponding orifices, like in the embodiment of FIG. 3A.

A connection means, for example an electric connection rod 441, passing through the insulating layer not shown and in contact with the conductive plate 411 allows to ensure the passage of the current from the flexible 440 towards the conductive plate 411.

The electric connection rod 441 can have a shape known per se. For example, this rod can comprise a threaded rod, a nut not shown and optionally a support 442: a terminal of the end of the flexible 440 can be inserted around the rod and compressed between the nut and the support 442 (or between the nut and the insulating layer).

A current sensor 460 is installed near the rod 441.

This current sensor can be embedded in the layer of insulating material not shown.

This sensor can measure the intensity of the current passing through the flexible or the rod 441, that is to say because of the insulation of the carbon brush carried out, the totality of the current collected by this carbon brush.

Figure 5:
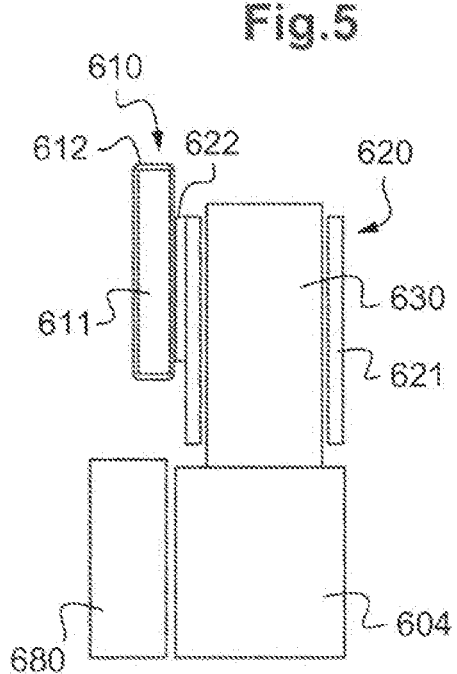
FIG. 5 is a cross-sectional and schematic view of an example of an assembly according to yet another embodiment of the invention.

In the embodiment of FIG. 5, a support having an overall shape of a plate 610 comprises a busbar 611 coated with an insulating layer 612.

A carbon brush 630 is received in a brush-holder 620 comprising spring means not shown for pushing the carbon brush 630 into contact against a rotating element 604.

Several rotating elements are provided, even though only one 604 is shown here, the rotating elements being separated from each other by insulating discs, one of which 680 is shown.

In this embodiment, the brush-holder 620 is made in two parts 621, 622 that can be assembled to one another in a reversible manner.

More precisely, the brush-holder 620 comprises a removable part 621 comprising the cage intended to receive the carbon brush 630, and an adapter part 622 fastened in a non-removable manner onto the support 610.

For example, the removable part can comprise the spring means exerting a pressure to push the carbon brush 630 into contact against the rotating element 604.

For example, the connection of the flexible not shown, one end of which is in contact with the carbon brush 630, to the conductive plate can be carried out by a connection means mounted on the brush-holder.

This connection means not shown, for example a rod system, can be mounted on the adapter part 622 and pass through the insulating layer 612 until contact with the busbar 611.

The connection means can for example be screwed, clipped, or other onto the adapter part 622.

Advantageously, a plug-set (or "plug-set" in English) system allowing to connect/disconnect the carbon brushes while the machine is under load, in particular in the case of a use in the synchronous generators of hydroelectric power plants, can be provided.

Figure 6A:
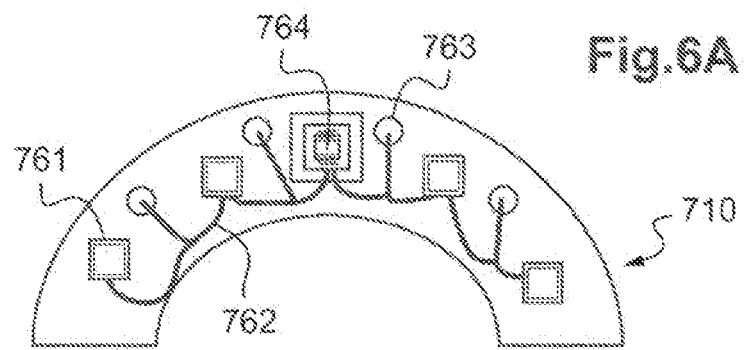
FIGS. 6A, 6B and 6C illustrate alternative embodiments, in which sensors and processing means are provided on the conductive plate.
Figure 6B:
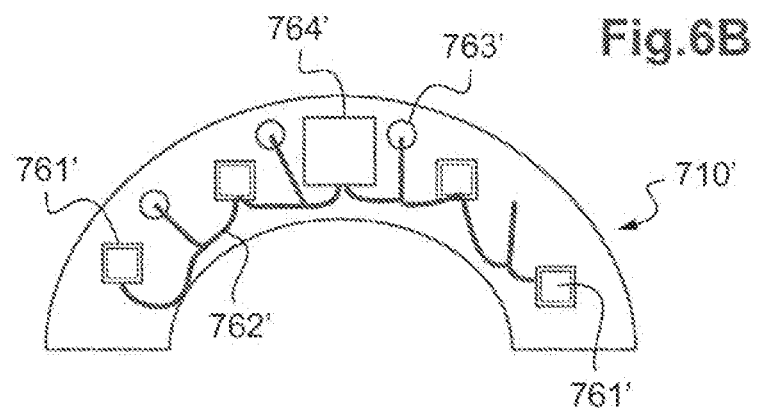
Figure 6C:
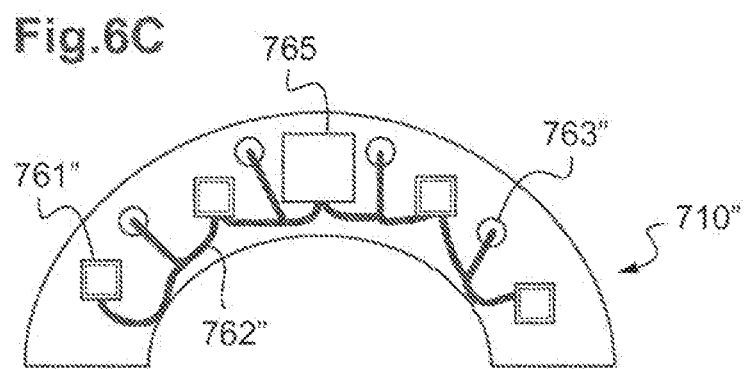

In reference to FIGS. 6A, 6B and 6C, supports 710, 710', 710" are shown seen from the side opposite to the side corresponding to the face on which the brush-holders are mounted. The brush-holders are not therefore visible in these figures.

The supports 710, 710', 710" can define orifices 763, 763', 763", the edges and the inner walls of which can be covered with insulating material, for the passage of wires connected to sensors installed on the face of the support on which the brush-holders are mounted. A washer made of insulating material received in an orifice can for example be provided.

It is also possible to arrange flexible passages directly in insulating material.

These sensors on the brush-holder side can for example comprise temperature sensors, for example sensors measuring the temperature in the layer of insulating material coating the busbar.

It is possible to estimate the temperature in the brush-holder according to the values measured by these sensors and according to thermal conductivity values stored in a database.

The references 761, 761', 761" designate sensors mounted on the face opposite to the face supporting the brush-holders, thus visible in these drawings, for example current sensors mounted around connection rods ensuring the transfer of the current collected.

It is advantageous to thus install sensors on the face opposite to the face supporting the brush-holders, relatively uncluttered, which can facilitate maintenance.

Conductive linear elements 762, 762', 762", here flexible, for example of the ribbon type (762, 762'), are connected to the sensors 761, 761', 761" and to the sensors on the non-visible face, while thus passing through the orifices 763, 763', 763".

The conductive linear elements 762, 762', 762" can be embedded in the insulating material coating the busbar.

In the embodiment of FIG. 6A, processing means in the form of a flexible printed circuit 764 or PCB (for Printed Circuit Board) laminated in the insulating material coating the two faces of the busbar is provided.

It is advantageous to provide at least one sensor on the same face as at least one processing element (processor or other), thus allowing to avoid piercing the conductive plate.

This can allow to obtain better distributed field lines, which limits heating. Moreover, this can allow to have a better creepage ("creepage" in English) distance.

The components are thus embedded in the insulating material, for example PEN.

In the embodiment of FIG. 6B, processing means in the form of a PCB of the card type, rigid, received in a housing 764' welded or screwed to the busbar, is provided.

The conductive linear elements 762' are flexible (ribbon).

In the embodiment of FIG. 6C, the conductive linear elements are conventional electric wires or flexibles, also embedded in the insulating material. Grooves can be provided in the support to receive these wires 762".

These wires 762" are connected to a printed circuit (processing means) received in a housing 765 mounted on the insulating layer, for example via screws.

In all cases, a connection of the CAN (for "Controller Area Network") bus type can further be provided.

The invention claimed is:

1. A current transfer system between a rotating element and a fixed element, the rotating element being moved with a movement of rotation with respect to the fixed element, said transfer system comprising
    a support having an overall shape of a plate on the periphery of the axis of rotation of the rotating element, comprising a conductive portion electrically connected to one out of the fixed element and the rotating element,
    at least one brush-holder mounted on and supported by, or integrated into, the support, and shaped to hold at least one conductive sliding contact element,
    the conductive sliding contact element, supported by the brush-holder and configured to be pushed into contact against the other out of the fixed element and the rotating element,
    a resistance element located between this conductive sliding contact element and the conductive portion of the support when the conductive sliding contact element is pushed into contact, to limit the passage of current directly between the conductive portion and the conductive sliding contact element,
    means for electric connection of the conductive portion of the support to a flexible rigidly connected to the conductive sliding contact element for the transfer of current between this conductive portion and the conductive sliding contact element.

2. The system according to claim 1, wherein the resistance element comprises an insulating element located between this conductive sliding contact element and the conductive portion of the support, when the conductive sliding contact element is supported by the brush-holder and pushed into contact, and the system is shaped so that the insulating element thus prevents the passage of current directly between the conductive portion and the conductive sliding contact element.

3. The system according to claim 1, further comprising at least one sensor capable of measuring a parameter value characterizing the operation of the conductive sliding contact element.

4. The system according to claim 3, further comprising at least two conductive linear elements electrically connecting the sensor to processing means in order to exchange measurements or controls,
    wherein these conductive linear elements are at least partly embedded in resistant or insulating material.

5. The system according to claim 3, further comprising processing means in communication with a ventilation device and with the sensor(s),
    wherein said processing means are arranged to control ventilation according to the measured values coming from the sensor(s).

6. The system according to claim 1, wherein the conductive portion comprises a conductive plate of the busbar type.

7. The system according to claim 6, wherein the resistance element is obtained by applying onto the conductive plate a resistant material having a resistivity of at least 0.1 ohm-meters.

8. The system according to claim 7, wherein the brush-holder defines at least one lug extending from a wall of the brush-holder towards the outside of the brush-holder, in a plane closer to the support than the location of the carbon brush, said location being defined by the walls of the brush-holder, and wherein said lug is laminated in the resistant or insulating material.

9. The system according to claim 7, wherein the resistance element is obtained by coating and/or overmolding the conductive plate with the resistant material.

10. The system according to claim 1,
wherein at least a part of the brush-holder is fastened in a non-removable manner onto the support.

11. The system according to claim 1, wherein the brush-holder is made from a single metal sheet.

12. An assembly comprising a rotating element, a fixed element, and the transfer system according to claim 1.

13. A method of transferring electric current in rotating electrical machine used in industry or in the wind power industry, comprising operating the assembly according to claim 12.

14. A method for manufacturing a current transfer system between a rotating element and a fixed element, the rotating element being moved with a movement of rotation with respect to the fixed element, the method comprising
providing a support having an overall shape of a plate, configured to be located on the periphery of the axis of rotation of the rotating element, comprising a conductive portion, the conductive portion being configured to be electrically connected to one out of the fixed element and the rotating element,
providing at least one brush-holder installed on or integrated into the support, shaped to hold a conductive sliding contact element,
installing the conductive sliding contact element in the brush-holder, this element being configured to be pushed into contact against the other out of the fixed element or the rotating element,
providing a resistance element located between the conductive sliding contact element when pushed into contact and the conductive portion of the support,
providing means for electric connection of the conductive portion to a flexible rigidly connected to the conductive sliding contact element for the transfer of current between the conductive plate and the conductive sliding contact element.

15. The method according to claim 14, further comprising applying a resistant material onto the conductive portion and/or onto the brush-holder in such a way as to form the resistance element.

* * * * *